United States Patent
MacLachlan et al.

(10) Patent No.: US 8,918,772 B1
(45) Date of Patent: Dec. 23, 2014

(54) STATICALLY ANALYZING PROGRAM CORRECTNESS FOR A DYNAMIC PROGRAMMING LANGUAGE

(75) Inventors: David MacLachlan, Morgan Hill, CA (US); Greg Miller, San Jose, CA (US)

(73) Assignee: Google Inc., Mountain View, CA (US)

( * ) Notice: Subject to any disclaimer, the term of this patent is extended or adjusted under 35 U.S.C. 154(b) by 1597 days.

(21) Appl. No.: 11/782,778

(22) Filed: Jul. 25, 2007

(51) Int. Cl.
*G06F 9/45* (2006.01)

(52) U.S. Cl.
USPC .......................... 717/154; 717/141; 717/159

(58) Field of Classification Search
CPC ... G06F 8/443; G06F 8/4441; G06F 11/3612; G06F 9/45516; G06F 8/41; G06F 11/3624; G06F 11/3628; G06F 9/3017; G06F 8/30; G06F 8/40; G06F 9/44521; Y02B 60/181
See application file for complete search history.

(56) References Cited

U.S. PATENT DOCUMENTS

| | | | | |
|---|---|---|---|---|
| 5,481,721 A * | 1/1996 | Serlet et al. | | 719/315 |
| 5,953,527 A * | 9/1999 | Cable | | 717/116 |
| 6,282,702 B1 * | 8/2001 | Ungar | | 717/154 |
| 7,107,585 B2 * | 9/2006 | Berent et al. | | 717/154 |
| 7,320,121 B2 * | 1/2008 | Krueger | | 717/106 |
| 7,367,025 B1 * | 4/2008 | Nikolov et al. | | 717/159 |
| 7,398,517 B2 | 7/2008 | Berg et al. | | |
| 7,584,455 B2 | 9/2009 | Ball | | |
| 7,617,489 B2 | 11/2009 | Peyton et al. | | |
| 7,624,304 B2 | 11/2009 | Thiagarajan et al. | | |
| 7,644,395 B1 * | 1/2010 | Frey et al. | | 717/128 |
| 7,703,075 B2 | 4/2010 | Das et al. | | |
| 7,958,493 B2 | 6/2011 | Lindsey et al. | | |
| 7,962,901 B2 | 6/2011 | McCamant et al. | | |
| 7,984,304 B1 * | 7/2011 | Waldspurger et al. | | 717/124 |
| 8,046,746 B2 | 10/2011 | Tillmann et al. | | |
| 8,752,035 B2 * | 6/2014 | Fanning et al. | | 717/154 |
| 2003/0009747 A1 * | 1/2003 | Duran | | 717/146 |
| 2003/0033594 A1 * | 2/2003 | Bowen | | 717/141 |
| 2003/0046671 A1 * | 3/2003 | Bowen | | 717/141 |
| 2003/0131347 A1 | 7/2003 | Allison | | |
| 2003/0145282 A1 | 7/2003 | Thomas et al. | | |
| 2004/0025148 A1 * | 2/2004 | Krueger | | 717/140 |
| 2005/0028145 A1 * | 2/2005 | Kang et al. | | 717/128 |
| 2005/0166095 A1 * | 7/2005 | Chander et al. | | 714/38 |
| 2006/0004810 A1 * | 1/2006 | Atkin et al. | | 717/124 |
| 2006/0259830 A1 | 11/2006 | Blevin et al. | | |
| 2007/0022411 A1 * | 1/2007 | Tromey | | 717/140 |
| 2007/0028210 A1 | 2/2007 | Meijer et al. | | |

(Continued)

OTHER PUBLICATIONS

Jeffrey Dean et al., Optimization of Object-Oriented Programs Using Static Class Hierarchy Analysis, University of Washington, pp. 1-24.*

(Continued)

*Primary Examiner* — Thuy Dao
*Assistant Examiner* — Hanh T Bui
(74) *Attorney, Agent, or Firm* — Birch, Stewart, Kolasch & Birch, LLP

(57) ABSTRACT

One embodiment of the present invention provides a system that uses static analysis to determine program correctness for a program written in a dynamic programming language. During operation, the system receives executable code for a program written in the dynamic programming language. The system identifies a program method called in the executable code, and determines if the program method is implemented for the executable code. If not, the system signals that the program method is not implemented for the executable code.

17 Claims, 4 Drawing Sheets

(56) References Cited

U.S. PATENT DOCUMENTS

| | | | |
|---|---|---|---|
| 2007/0067372 | A1 | 3/2007 | Meijer |
| 2007/0226698 | A1* | 9/2007 | Cascaval et al. ............... 717/131 |
| 2007/0261029 | A1 | 11/2007 | Iyer |
| 2008/0235675 | A1 | 9/2008 | Chen |
| 2008/0307397 | A1* | 12/2008 | Angell ........................... 717/131 |
| 2009/0288067 | A1 | 11/2009 | Nathan et al. |
| 2010/0017620 | A1 | 1/2010 | Horne et al. |
| 2010/0299660 | A1 | 11/2010 | Torgersen et al. |
| 2011/0179402 | A1 | 7/2011 | Buckley et al. |

OTHER PUBLICATIONS

Abdoulaye Gamatie et al.; Towards Static Analysis of SIGNAL Programs using Interval Techniques; 2006; retrieved online on Jul. 31, 2014; pp. 1-15; Retrieved from the Internet: <URL: ftp://ftp.irisa.fr/local/signal/publis/articles/slap06_interv.pdf>.*

Sitij Agrawal et al.; Optimizing Stream Programs Using Linear State Space Analysis; 2005; ACM; retrieved online on Jul. 31, 2014; pp. 126-136; Retrieved from the Internet: <URL: http://delivery.acm.org/10.1145/1090000/1086315/p126-agrawal.pdf?>.*

Chanjin Hong and Ahmed H. Tewfik; Heuristic Reusable Dynamic Programming: Efficient Updates of Local Sequence Alignment; 2009; IEEE; retrieved online on Jul. 31, 2014; pp. 570-582; Retrieved from the Internet: <URL: http://ieeexplore.ieee.org/stamp/stamp.jsp?tp=&arnumber=4799770>.*

Allwood, T., "Pluggable, Iterative Type Checking for Dynamic Programming Languages," University of London, Imperial College of Science, Technology and Medicine, accessed at http://www.doc.ic.ac.uk/~tora/previous/project/Report.pdf, accessed on Aug. 29, 2012.

Baars, A.I. and Swierstra, S.D., "Typing Dynamic Typing," 2002 ACM, Institue of Information and Computing Sciences, pp. 157-166, accessed at http://dl.acm.org/citation.cfm?doid=583852.581494, accessed on Aug. 29, 2012.

Bush, W.R., et al., "A static analyzer for finding dynamic programming errors," *Softw. Pract. Exper.* 30:775-802, John Wiley & Sons, Ltd., United States (2000).

Paulson, L.D., "Developers Shift to Dynamic Programming Languages," IEEE, pp. 12-15, accessed at http://ieeexplore.ieee.org/stamp/stamp.jsp?tp=&arnumber=4085614, accessed on Aug. 29, 2012.

Non-Final Office Action mailed May 25, 2011 in U.S. Appl. No. 11/782,793, MacLachlan and Van Lenten, filed Jul. 25, 2007.

Non-Final Office Action mailed Feb. 10, 2012 in U.S. Appl. No. 11/782,793, MacLachlan and Van Lenten, filed Jul. 25, 2007.

Notice of Allowance mailed Jun. 15, 2012 in U.S. Appl. No. 11/782,793, MacLachlan and Van Lenten, filed Jul. 25, 2007.

Co-Pending U.S. Appl. No. 11/782,793, MacLachlan and Van Lenten, filed Jul. 25, 2007.

* cited by examiner

STATICALLY ANALYZING PROGRAM CORRECTNESS FOR A DYNAMIC PROGRAMMING LANGUAGE

BACKGROUND

1. Field of the Invention

The present invention relates to techniques for analyzing program correctness. More specifically, the present invention relates to a method and an apparatus for statically analyzing program correctness for a program written in a dynamic programming language.

2. Related Art

A compiler is a computer program that translates program text written in a high-level programming language into executable instructions. Program developers generally specify the functionality of a given program using such a high-level programming language, and then use the compiler to convert the high-level structures of that programming language into machine-specific instructions.

In a statically-typed programming language, the compiler can verify and enforce the data-types for the language (e.g., perform "type-checking") at compile time, which means that the system does not need to resolve any data-types at run-time. For instance, the compiler for a statically-typed language can determine the correct method implementation for a called program method at compile time, and can then include this method implementation in the executable program binary. Alternatively, in a dynamically-typed programming language, data-types may not be known until run-time. Because of this ambiguity, an incomplete program written in such a language may still compile and link, but may not run correctly due to method calls that cannot be resolved at run-time. For instance, program methods hidden in an obscure conditional execution path may not be detected by program testing, and may result in program failure after the program has been released.

Hence, what is needed is a method that facilitates writing programs in dynamic programming languages without the above-described limitations.

SUMMARY

One embodiment of the present invention provides a system that uses static analysis to determine program correctness for a program written in a dynamic programming language. During operation, the system receives executable code for a program written in the dynamic programming language. The system identifies a program method called in the executable code, and determines if the program method is implemented for the executable code. If not, the system signals that the program method is not implemented for the executable code.

In some embodiments, the system identifies the program methods that are implemented in the program's executable code as well as any libraries of executable code associated with the program. The system also identifies the program methods that are called within the executable code of the program, and compares the set of called program methods with the set of implemented program methods. The system signals an error if it identifies called program methods that are not implemented.

In some embodiments, the system receives a list of program methods that are known to not be implemented in the executable code. The system does not signal an error for the program methods in this list, even if that program method is not implemented.

In some embodiments, a run-time environment for the dynamic programming language determines the program method implementation to be used for a called program method.

In some embodiments, the dynamic programming language is the Objective C and/or Objective C++ programming language.

In some embodiments, the system uses debug information included in the executable code for the program to determine if a called program method is implemented in the executable code.

In some embodiments, the system preserves the benefits of dynamic method-checking while also providing some of the benefits of static method-checking.

Figure 1:
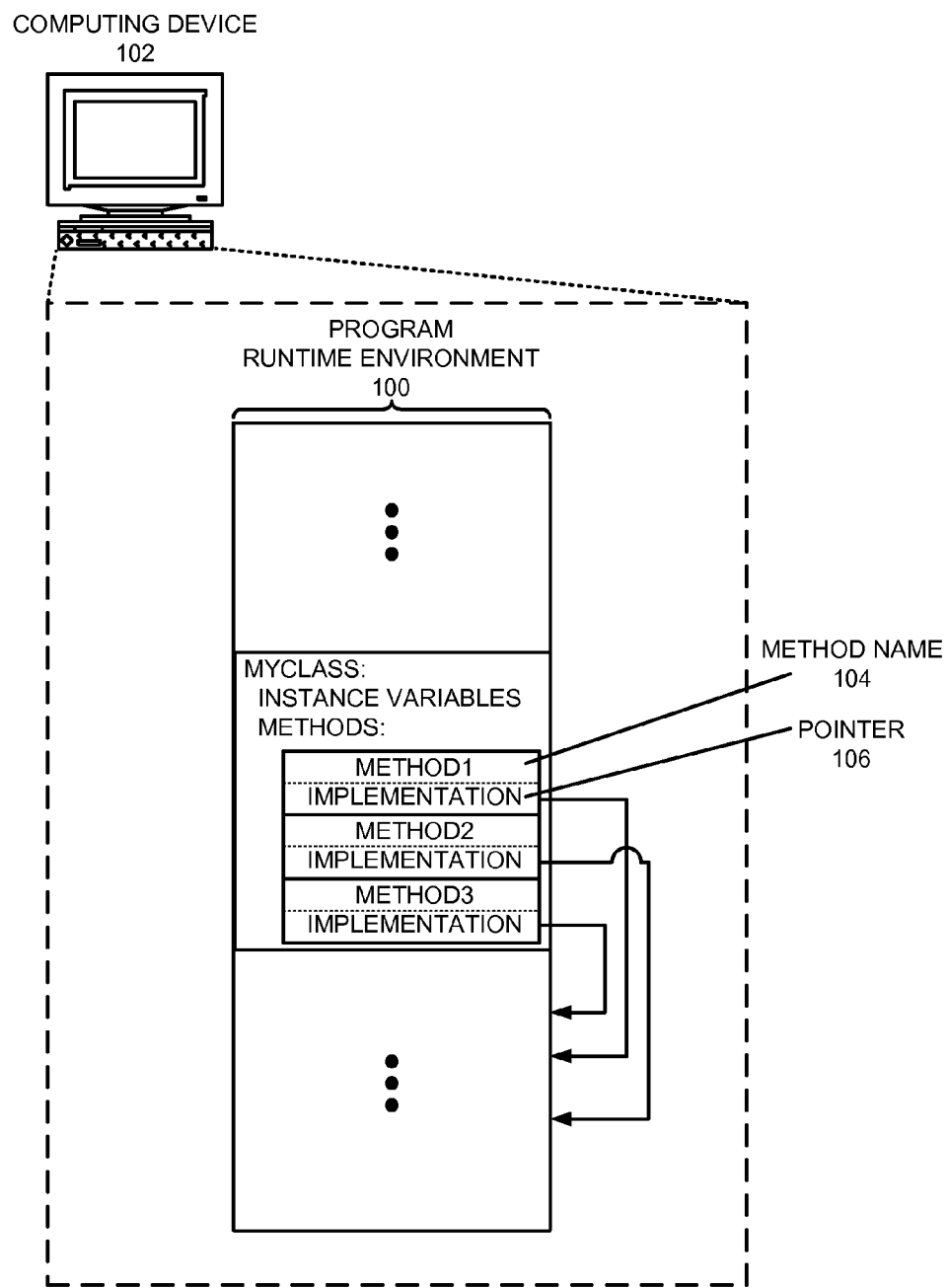
FIG. 1 illustrates a program run-time environment for a program written in Objective C and compiled on a computing device using an Objective C compiler in accordance with an embodiment of the present invention.

Table 1 illustrates sample method invocations in both a statically-typed language and a dynamically-typed language and a representation of the output generated by their respective compilers in accordance with an embodiment of the present invention.

Table 2 illustrates exemplary Objective C code for the interface to a class in accordance with an embodiment of the present invention.

Table 3 illustrates an exemplary Objective C program that can be compiled successfully but is incomplete and will not run correctly in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Dynamically-Typed Languages

Program code written in dynamically-typed programming languages (such as Objective C or Objective C++) is typically compiled into machine instructions in a manner similar to program code written in statically-typed programming languages such as C or C++. However, for dynamically-typed programming languages, a set of decisions, such as which set of instructions should be used for a given program method (also referred to simply as a method), may not be resolved until run-time. This dynamic nature sometimes allows programs to compile and link without errors, but not run correctly due to structures that cannot be resolved at run-time. In statically-typed languages, such decisions are typically made at compile time or at the time that a program binary is linked, thereby resolving (or signaling) any potential issues at that time.

Table 1 illustrates sample method invocations in both a statically-typed programming language (C++) and a dynamically-typed programming language (Objective C), as well as a representation of the output generated by their respective compilers. For the C++ compiler, the invocation of the method doSomething on instance s of class sample results in a (static) call to a method for the sample class that includes the calling object (this) as the argument. This class method is compiled into an explicit set of instructions and the program is statically linked-together such that, during execution, the thread of execution jumps to the set of instructions for the method implementation. Once the code has been compiled, the executable is fixed, and there is no mechanism to affect methods within the executable.

TABLE 1

```
C++:
Program code:
    sample *s = (allocate object of class sample);
    s.doSomething( ); // class method invocation
Compiler generates:
    ...sample_doSomething (this)
Objective C:
Program code:
    sample *s = (allocate object of class sample);
    [s doSomething] // method invocation
Compiler generates:
    ...objc_msgsend (self, selector)
```

In Objective C, method invocations can be considered as "messages" sent to objects of a specified type. For instance, a substantially similar set of code written in Objective C may instead compile to a general method (objc_msgsend) that takes as arguments both an object (in this case self) and a selector (selector) that together indicate to a run-time environment the specific method implementation that should be used. Note that dynamically-typed languages may include run-time mechanisms to facilitate such dynamic operations. In Objective C, the dynamic library libobjc is linked in to handle such dynamic method calls (often referred to as "messages" in Objective C). Deciding the specific method code at run-time can provide a range of benefits, including allowing methods to be overridden and/or program behavior to be changed after compilation.

TABLE 2

```
// Class interface and implementation for "MyClass"
@interface MyClass : NSObject {
    int aVar;              // exemplary instance variable
}
- (int)method1;            // exemplary method declaration
- (int)method2;
@end
@implementation MyClass
- (int) method1 {          // exemplary method implementation
    return 1;
}
- (int) method2 {
    return 2;
}
@end
// Category definition
@interface MyClass (MyClassCategory)
- (int)method3;
@end
@implementation MyClass (MyClassCategory)
- (int) method3 {
    return 3;
}
@end
```

Table 2 illustrates exemplary Objective C code for the interface to a class ("MyClass"), which inherits from the type NSObject. Table 2 illustrates an interface that declares an instance variable and two methods, as well as implementations for the two methods. This class can later be extended beyond its initial declaration by defining a "category" that affects the class. For instance, the category definition shown in Table 2 adds a definition and implementation for a third method for MyClass. This category definition may be included into the program binary at compile time, or also later as part of a dynamic library that is loaded into the program during execution. Note that such functionality can be added without re-compiling the original interface definition.

The ability to add and/or modify methods without re-compiling the entire program facilitates manipulating large sets of existing code. For instance, a developer to selectively extend portions of a framework with thousands of classes (such as the Objective C Cocoa framework) without requiring access to the source code for the framework. Instead, the developer can extend and compile only the desired set of method definitions and implementations. For example, a developer can fix a bug in a framework method by creating a replacement method in a dynamic library and then having the run-time environment automatically redirect messages to the given class and selector to that replacement method. Such changes can be limited only to a given executable file, and hence not affect other programs running on the same machine that use the original set of executable code. Categories that dynamically extend and/or add additional methods to a parent class can also be used to easily add functionality to any classes that inherit from that parent class (without re-compilation of the original classes). Such techniques allow developers to easily leverage and extend existing capabilities while writing software. In statically-typed languages, such extensions are typically impossible without access to the full source code and re-compilation of all of the involved classes.

TABLE 3

```
#import <Foundation/Foundation.h>
@interface NSString (MissingCategory)
- (void)methodMissing;
@end
int main(int argc, char**argv) {
```

TABLE 3-continued

```
NSAutoreleasePool *pool = [ [NSAutoreleasePool alloc] init];
[@"Hello" methodMissing];
[pool release];
    return 0;
}
```

While dynamically-typed programming languages can provide substantial benefits, as described above, they can also present some drawbacks. As mentioned previously, dynamic resolution of methods can sometimes result in programs that compile and link without errors, but then do not run correctly. For instance, Table 3 illustrates an exemplary Objective C program that can be compiled successfully, but is incomplete and will not run correctly. In this case, the methodMissing selector has been declared, but no methodMissing method implementation is defined. In this example the program would crash at launch, but if the usage of methodMissing was hidden in an obscure conditional execution path (e.g., only ran on a certain date, or when a certain set of conditions were met), such an error might not be detected during testing and result in errors after the program has been released.

One embodiment of the present invention provides a system that verifies the completeness of a program written in a dynamically-typed programming language. This system examines executable code for a program to compares the methods that have been defined with the methods that are called.

Statically Analyzing Program Correctness for Dynamic Languages

In one embodiment of the present invention, the run-time environment associated with a dynamically-typed programming language tracks methods and implementations associated with these methods. For instance, an Objective C compiler typically loads into the executable format a set of information relating to the different classes and categories found in the compiled executable code. This information describes the instance variables and methods found in those classes and categories, and is used by the run-time environment to identify the method implementation that should be called when an instance of a class invokes a message (I.e., a method call).

FIG. 1 illustrates a program run-time environment 100 for a program written in Objective C, compiled using an Objective C compiler, and executing on a computing device 102. The compiler includes in the program binary information relating to instance variables and methods for defined classes and categories, including information for method names and method implementations. The Objective C run-time environment uses this information to build and maintain a set of tables that track how method names 104 map to method implementations. The run-time environment can determine a method implementation that corresponds to a given message by: (1) determining the class associated with the message; (2) using the selector to look up the corresponding method name 104 (if available); and (3) using a pointer 106 to access the corresponding method implementation. Note that the run-time environment can read in additional code segments and/or libraries during program execution, and, depending on the category and class definitions in the new executable content, may add and/or replace previous mappings in these run-time tables.

Compilers for some dynamic programming languages may give a warning during compilation if the program attempts to send a message that is not defined in an interface. For instance, for the example shown in Table 2, a message (or method call) to a method4 would result in a warning at compile time, and program failure (if the message was called) at run-time. However, if the program source code includes a method declaration for method4, but no method implementation for method4, the compiler may compile the program without issuing such a warning. In this case, upon execution, the run-time environment would not find a corresponding method implementation, and would return an exception. Because testing all possible paths is typically unfeasible for non-trivial programs, finding such missing method implementations may depend on where the method call is located in the path of execution and may make it difficult to find missing method implementations during program testing. In a statically-linked environment, the compiler can ensure that all of the method implementations are present and that the executable is hence complete, but in an environment with dynamically-linking neither the compiler nor the linker provides such guarantees.

In one embodiment of the present invention, the system analyzes a compiled executable for a dynamic programming language to find all messages (or called methods), and then analyzes class and category information included in the executable code and all dependent libraries to determine whether the called messages are supported. For instance, the system can be used every time the source code for a program is compiled, to notify the user of potentially-unimplemented methods. The system can hence provide some of the benefits of static type-checking while preserving the benefits of dynamic type-checking.

Figure 2:
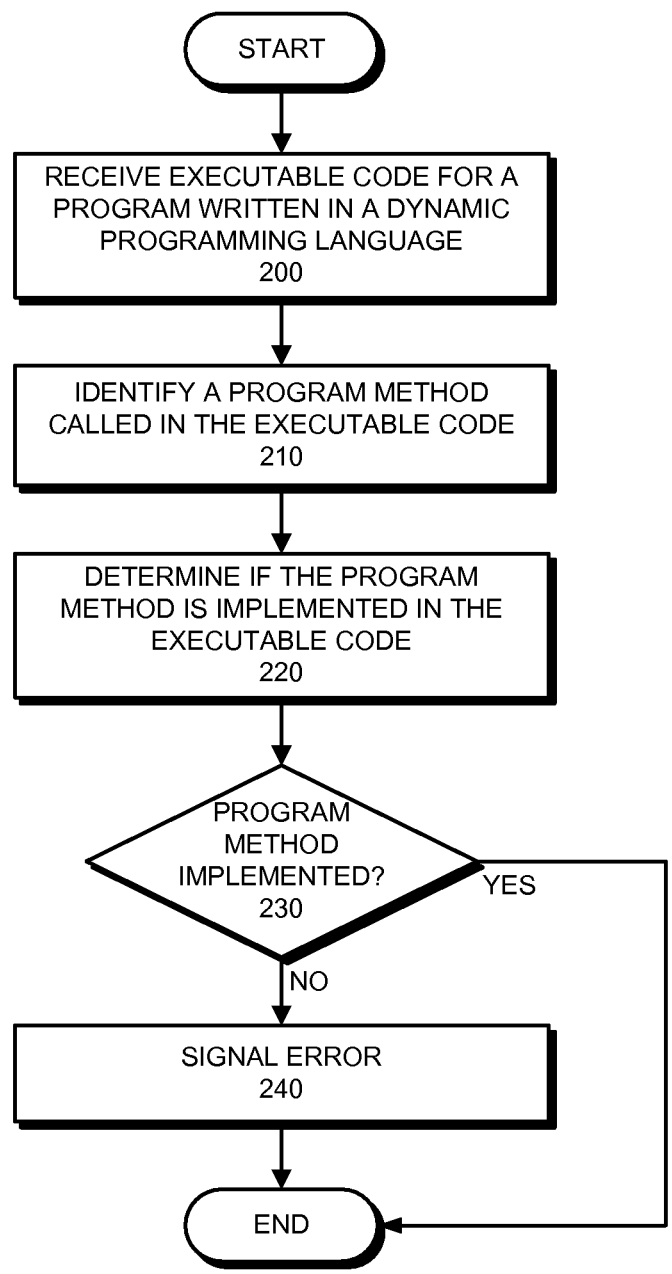
FIG. 2 presents a flow chart that illustrates the process of analyzing compiled executable code to determine if an identified program method which is called in the executable code is associated with a method implementation in the executable code in accordance with an embodiment of the present invention.

FIG. 2 presents a flow chart that illustrates the process of analyzing a compiled executable for a dynamic programming language to determine if an identified program method called in the executable code is associated with a method implementation in the executable code. During operation, the system receives executable code for a program written in the dynamic programming language (operation 200). The system identifies a program method called in the executable code (operation 210), and then scans through the information in the executable code to determine the program method is implemented in the executable code (operation 220). If so, the process completes (operation 230). If no method implementation is associated with the called program method, the system signals an error (operation 240).

Figure 3:
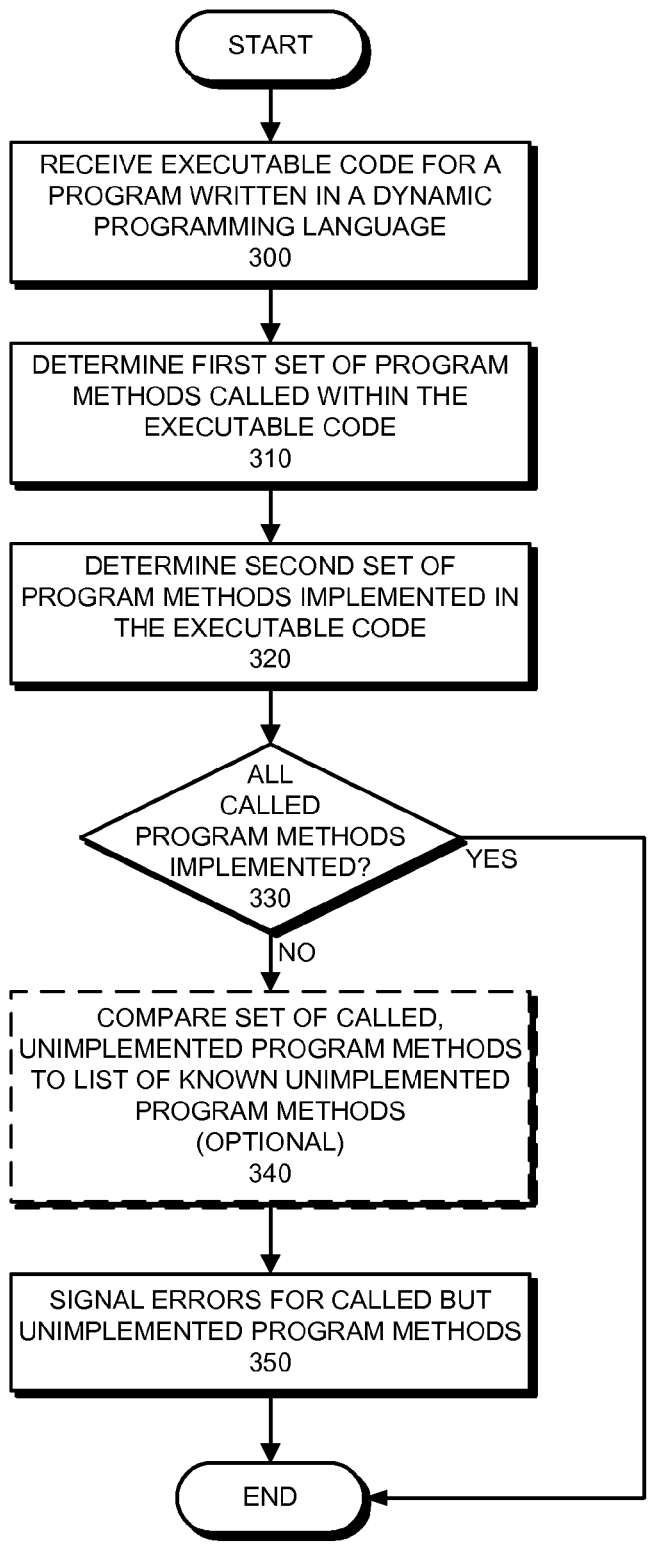
FIG. 3 presents a flow chart that illustrates the process of checking all of the called program methods in a set of executable code to ensure that all of the called program methods are implemented in accordance with an embodiment of the present invention.

FIG. 3 presents a flow chart that illustrates the process of checking all of the called program methods in a set of executable code to ensure that all of the called program methods are implemented. During operation, the system receives executable code for a program written in the dynamic programming language (operation 300). The system determines a first set of program methods that are called within the executable code (operation 310), and then scans through the information in the executable code to determine if corresponding program methods are implemented in the executable code (operation 320). The system compares these two sets to determine if all of the called program methods are implemented (operation 330), and then signals errors for called program methods that are not implemented (operation 350).

Note that in some environments that use dynamic type-checking, a method may validly be declared but not implemented. For instance, in some environments one program may call methods in another program (e.g. using distributed objects in the Cocoa framework), and hence the executable code may declare and call a program method that is not implemented locally, but instead is implemented in another program's executable code.

In one embodiment of the present invention, the system checks a list of program methods that are known to not be implemented in the executable code. For instance, a developer may identify these program methods as being validly unimplemented. The system checks the set of called-but-unimplemented program methods against this list to ensure that no error messages are signaled for such program methods, as illustrated in FIG. 3 as an optional operation (operation 340).

In one embodiment of the present invention the system can determine whether a corresponding program method is implemented in the executable code using a variety of techniques. For instance, the system may check the names of implemented methods to ensure that a method implementation of the same name exists for every called method. Note that such a technique may result in a range of correctness assurances. If method names are relatively unique, performing a name-based check can provide a fairly complete check of the called methods. Although, depending on program characteristics, such a check may not catch every missing method implementation, the system can provide a beneficial safety net that indicates potential problems during program development and prior to program release.

In one embodiment of the present invention the system can use debug information generated during program compilation to improve the process of ensuring that a method implementation exists for every called method. While some embodiments of the system ensure only that some method implementation exists in the program with the same name as the called method, debug symbols can facilitate determining whether a given method implementation with the same name is in the same scope as the called method. For instance, debug symbols may include type information that ensures that a selector for a called class matches a method name for a method implementation in a class of the same (or equivalently-valid) type. Note that using debug information may involve performing an special compilation with debug information enabled to perform such a detailed method-implementation check. Note also there may still be special cases for methods in the dynamic programming language where even additional debug information is insufficient to (statically) confirm that a method implementation exists for a called method. For instance, in Objective C, an object pointer of type "id" can be used to point to any type of object (substantially similar to a void pointer in the C programming language). Even additional type information provided via debug information may not be sufficient to determine the potential class method implementations that might be used for the corresponding object pointed by the id-type object pointer.

Figure 4:
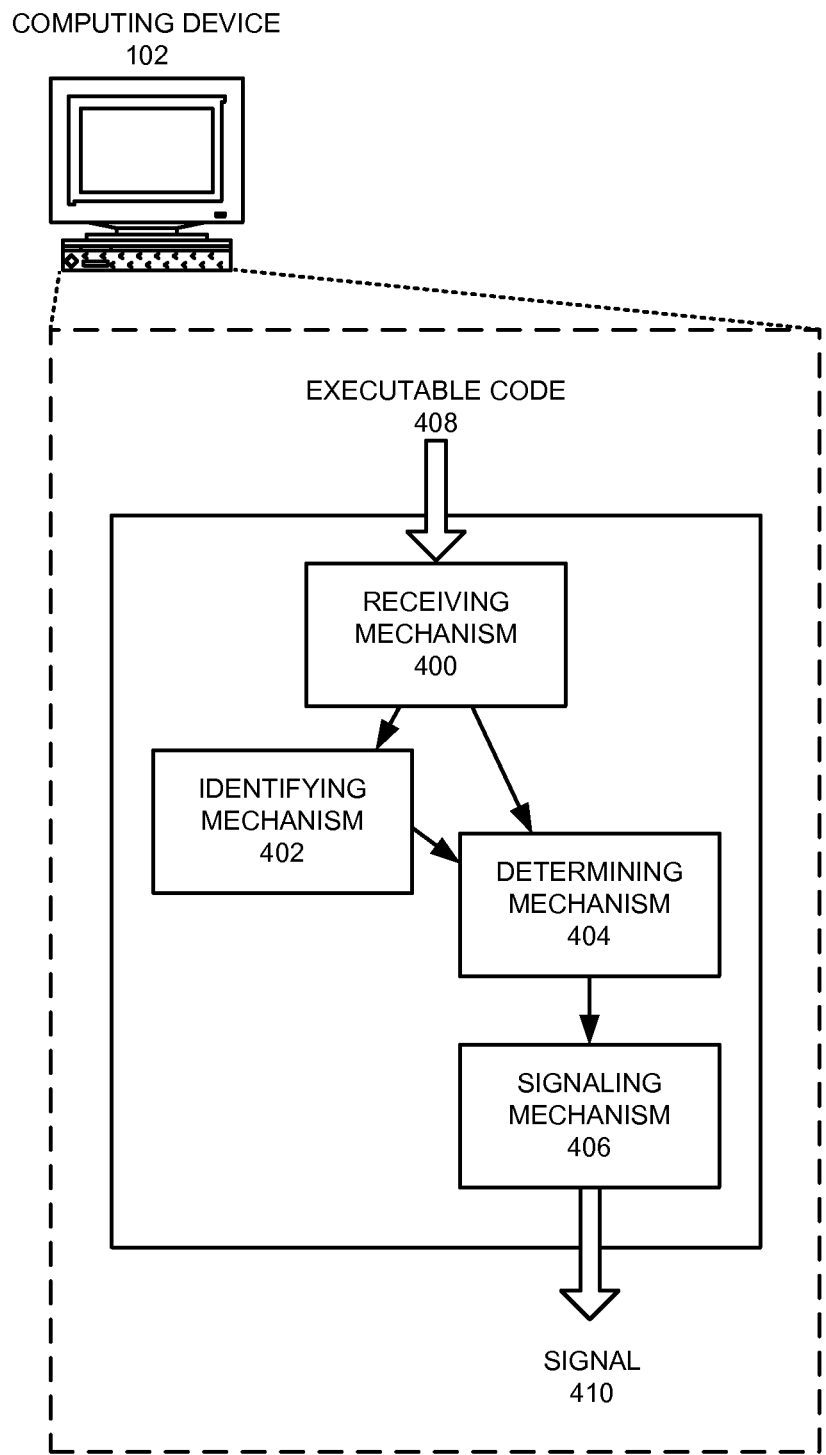
FIG. 4 illustrates an apparatus that statically analyzes program correctness for a dynamic programming language in accordance with an embodiment of the present invention.

FIG. 4. illustrates an apparatus in a computing device 102 that statically analyzes program correctness for a dynamic programming language. In FIG. 4, receiving mechanism 400 receives executable code for a program written in a dynamic programming language. An identifying mechanism 402 identifies a program method called in executable code 408, and a determining mechanism 404 determines if the program method is implemented in the executable code 408. Moreover, signaling mechanism 406 outputs a signal 410 when the program method is not implemented in executable code 408.

In summary, one embodiment of the present invention scans the executable code of a program binary to find the names of method selectors and/or classes that are referenced and compares them against the names of method selectors and/or classes implemented in the executable code and any supporting libraries. Hence, the system can verify that a method and/or class with a given name is implemented somewhere in the executable code, thereby reducing the likelihood of program omissions and errors. Note that this system can be implemented without modifying the compiler for the dynamic programming language.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for statically analyzing program correctness for a dynamic programming language, comprising:
   receiving executable code for a program written in the dynamic programming language;
   identifying a program method called in the executable code, wherein the called program method includes one or more instructions that are not resolved until a run-time of the program; and
   determining if the called program method is implemented for the executable code, said determining including
      identifying a first set of one or more program methods which are implemented in the executable code and libraries of executable code associated with the executable code;
      identifying a second set of one or more program methods which are called within the executable code
      comparing the first set of program methods and the second set of program methods; and
      identifying one or more program methods in the second set of program methods that are not contained in the first set of program methods;
   wherein
   if the called program method is not implemented in the executable code, signaling an error that the called program method is not implemented for the executable code prior to the run-time by signaling the error for the one or more program methods that are called but not implemented.

2. The method of claim 1, wherein the identifying one or more program methods that are not contained in the first set of program methods further comprises:
   receiving a third set of one or more program methods known to be validly not implemented in the executable code; and
   not signaling the error for one of the program methods which is called, not contained in the first set, and is a member of the third set of program methods.

3. The method of claim 1, wherein the dynamic programming language is Objective C or Objective C++.

4. The method of claim 1, wherein the determining comprises:
   determining that the executable code for the program includes debug information; and
   determining if the called program method is implemented for the executable code using the debug.

5. The method of claim 1, wherein the method preserves benefits of dynamic method-checking while also providing benefits of static method-checking.

6. The method of claim 1, wherein the identifying a program method comprises:
   identifying the program method called in the executable code, wherein the program method is called as part of a conditional execution path that only runs the program method on a certain date.

7. The method of claim 1, wherein the called program method is implemented if the called program method includes one or more lines of code that are executed when the called program method is executed.

8. A non-transitory computer-readable storage medium storing instructions that when executed by a computer cause the computer to perform a method for statically analyzing program correctness for a dynamic programming language, the method comprising:
   receiving executable code for a program written in the dynamic programming language;
   identifying a program method called in the executable code, wherein the called program method includes one or more instructions that are not resolved until a run-time of the program; and
   determining if the called program method is implemented for the executable code, said determining including
      identifying a first set of one or more program methods which are implemented in the executable code and libraries of executable code associated with the executable code; and
      identifying a second set of one or more program methods which are called within the executable code; and
      comparing the first set of program methods and the second set of program methods; and
      identifying one or more program methods in the second set of program methods that are not contained in the first set of program methods;
   wherein
      if the called program method is not implemented in the executable code, signaling an error that the called program method is not implemented for the executable code prior to the run-time by signaling the error for the one or more program methods that are called but not implemented.

9. The non-transitory computer-readable storage medium of claim 8, where the identifying program methods that are not contained in the first set of program methods further comprises:
   receiving a third set of one or more program methods known to be validly not implemented in the executable code; and
   not signaling the error for one of the program methods which is called, not contained in the first set, and is a member of the third set of program methods.

10. The non-transitory computer-readable storage medium of claim 8, wherein the dynamic programming language is Objective C or Objective C++.

11. The non-transitory computer-readable storage medium of claim 8, wherein the determining comprises:
   determining that the executable code for the program includes debug information; and
   determining if the called program method is implemented for the executable code using the debug information.

12. The non-transitory computer-readable storage medium of claim 8, wherein the method preserves benefits of dynamic method-checking while also providing benefits of static method-checking.

13. An apparatus that statically analyzes program correctness for a dynamic programming language, comprising:
   a receiving mechanism configured to receive executable code for a program written in the dynamic programming language;
   an identifying mechanism configured to identify a program method called in the executable code, wherein the called program method includes one or more instructions that are not resolved until a run-time of the program;
   a determining mechanism configured to determine if the called program method is implemented for the executable code; and
   a signaling mechanism implemented on a processor of the apparatus that when executed signals an error if the called program method is not implemented in the executable code prior to the run-time
   wherein the determining mechanism is further configured to determine a first set of one or more program methods which are implemented in the executable code and any libraries of executable code associated with the executable code;
   wherein the determining mechanism is further configured to determine a second set of one or more program methods which are called within the executable code;
   wherein the apparatus further includes a comparing mechanism configured to compare the first set of program methods and the second set of program methods;
   wherein the determining mechanism is further configured to determine one or more program methods in the second set of program methods that are not contained in the first set of program methods; and
   wherein the signaling mechanism is further configured to signal an error for the one or more program methods that are called but not implemented.

14. The apparatus of claim 13,
   wherein the receiving mechanism is further configured to receive a third set of one or more program methods known to be validly not implemented in the executable code; and
   wherein the signaling mechanism is further configured to not signal the error for one of the program methods which is called, not contained in the first set, and is a member of the third set of program methods.

15. The apparatus of claim 13, wherein the dynamic programming language is Objective C or Objective C++.

16. The apparatus of claim 13,
   wherein the executable code for the program includes debug information; and
   wherein the determining mechanism is configured to use the debug information to determine if the program method is implemented for the executable code.

17. The method of claim 1, wherein the identifying comprises:
   identifying the program method called in the executable code, wherein the program method is called when a set of conditions are met as part of a conditional execution path of the executable code.

* * * * *